Jan. 27, 1948.   D. B. SUGGS   2,435,168
AIRPLANE ENGINE NACELLE
Filed Nov. 20, 1944   3 Sheets-Sheet 1
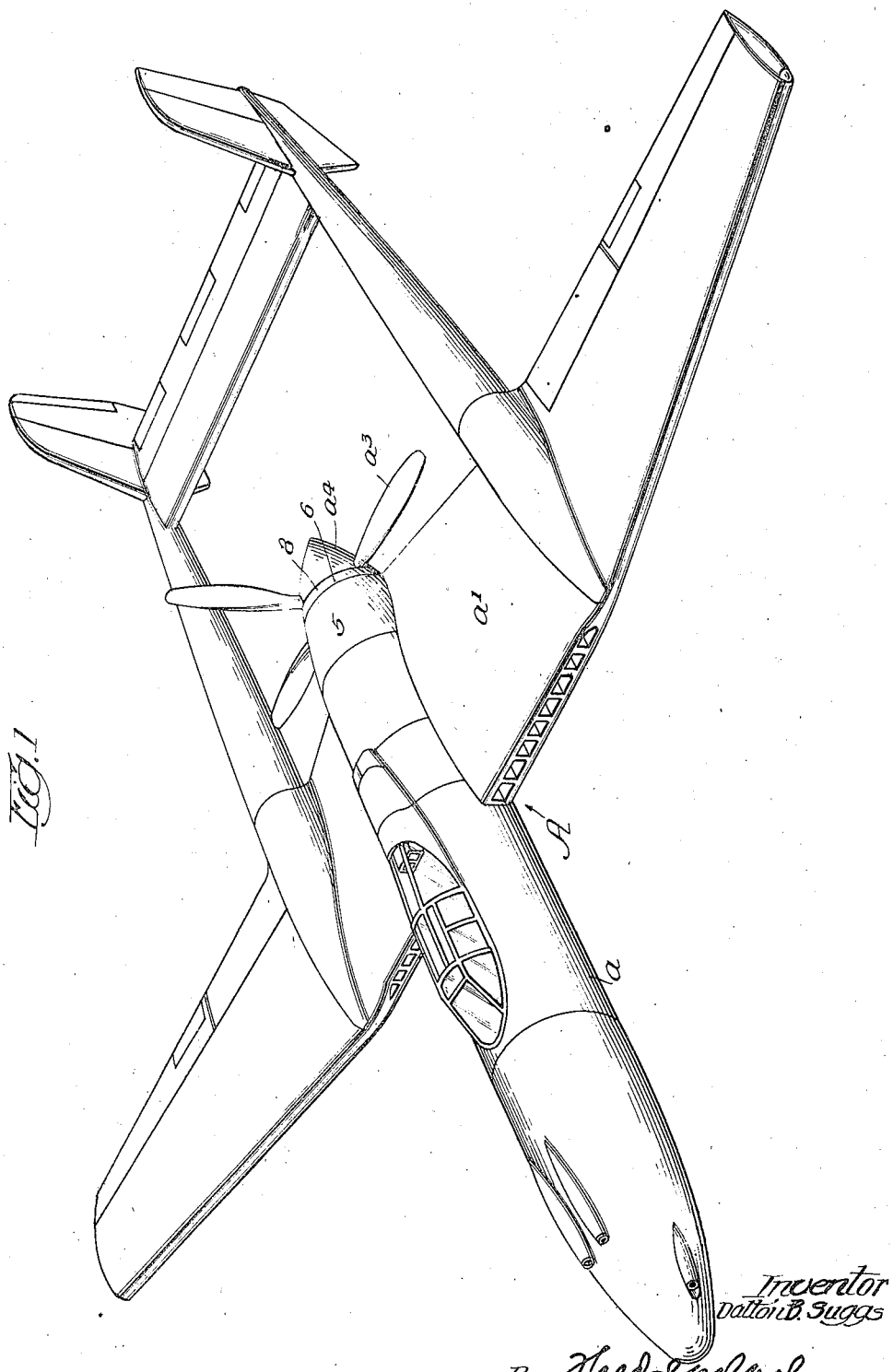

Jan. 27, 1948.  D. B. SUGGS  2,435,168
AIRPLANE ENGINE NACELLE
Filed Nov. 20, 1944  3 Sheets-Sheet 2
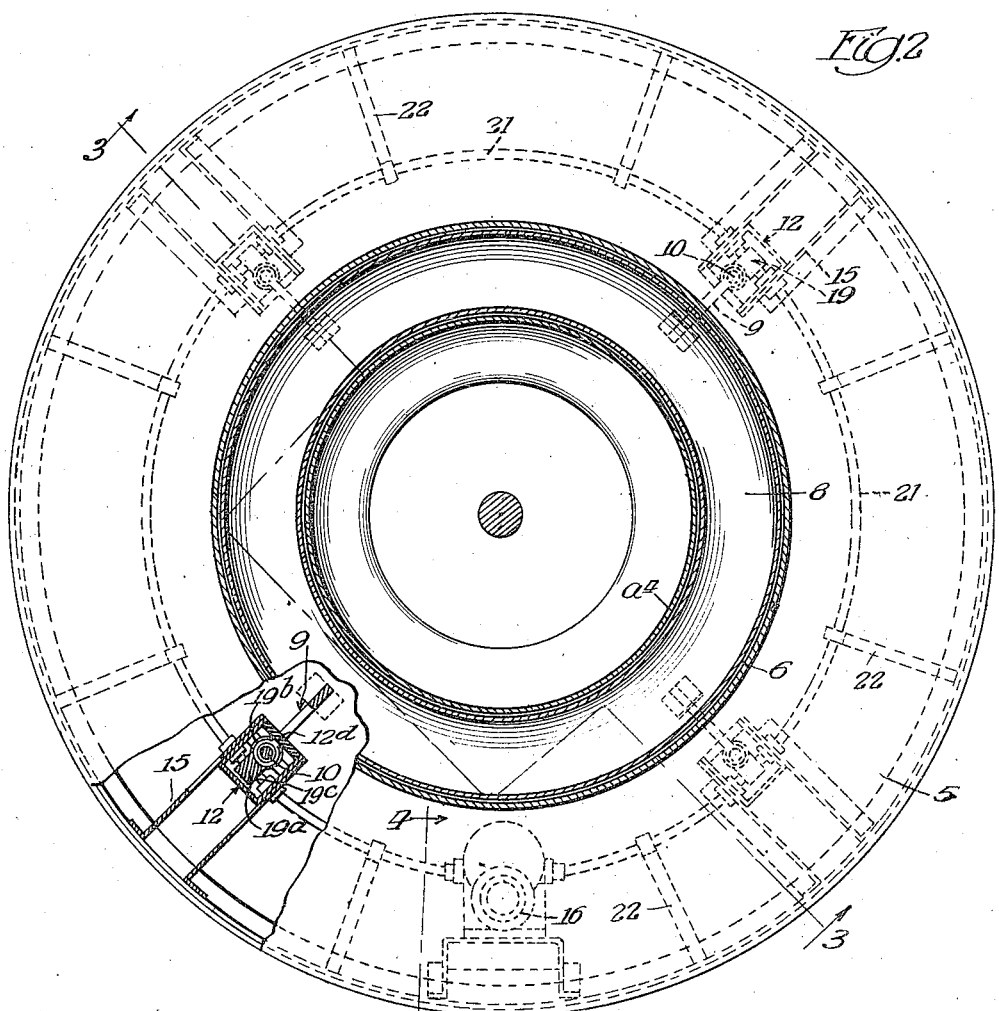
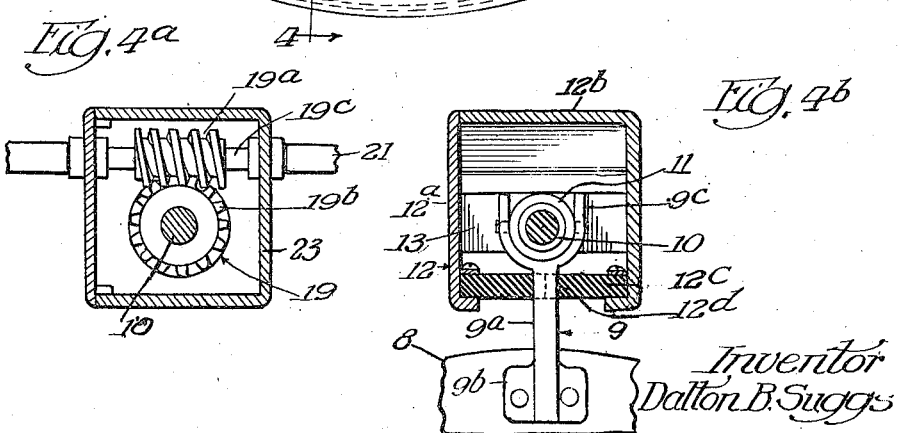
Inventor
Dalton B. Suggs
By Fred Gerlach atty.

Jan. 27, 1948. D. B. SUGGS 2,435,168
AIRPLANE ENGINE NACELLE
Filed Nov. 20, 1944 3 Sheets-Sheet 3
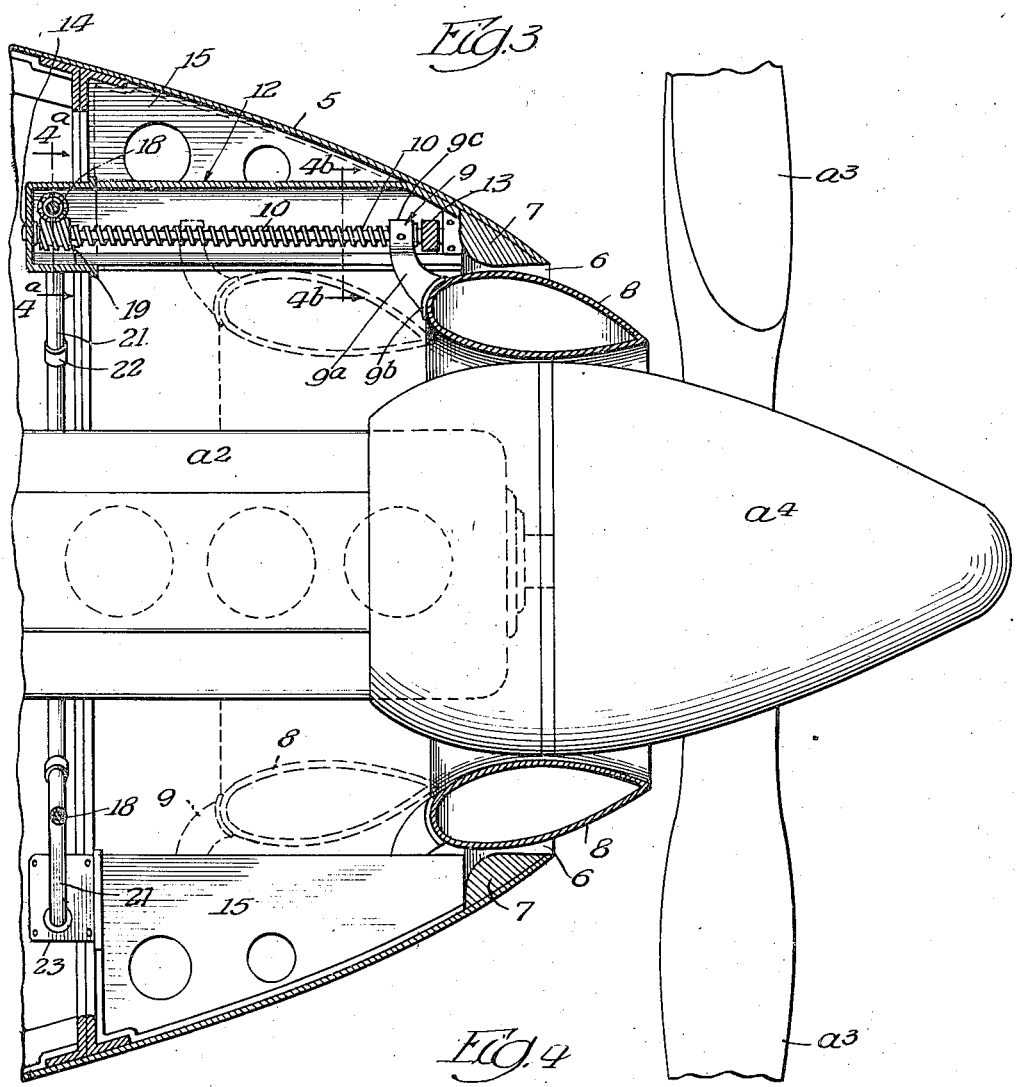
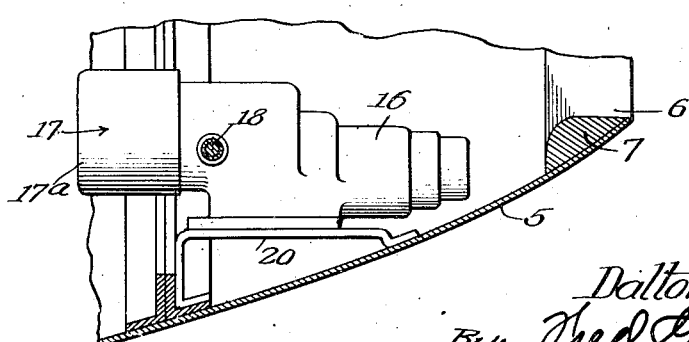
Inventor
Dalton B. Suggs
By: Fred Gerlach
atty.

Patented Jan. 27, 1948

2,435,168

UNITED STATES PATENT OFFICE 2,435,168

AIRPLANE ENGINE NACELLE

Dalton B. Suggs, Fort Worth, Tex., assignor to Consolidated Vultee Aircraft Corporation, San Diego, Calif., a corporation of Delaware Application November 20, 1944, Serial No. 564,392

3 Claims. (Cl. 123—171)

1

The present invention relates generally to nacelles for airplanes. More particularly the invention relates to that type of airplane nacelle which serves as a housing medium for the propeller driving engine of the airplane and is adapted under certain conditions to have air flow through it in order to cool the engine by the absorption of heat therefrom.

One object of the invention is to provide an airplane engine nacelle of this type which is designed and arranged so that the end thereof that is adjacent the propeller is spaced outwards from the conventional spinner on the propeller hub and forms an annular air opening therewith, and has associated with it novel means for controlling the flow of air through the annular air opening in order to regulate the volume of cooling air which is passed over the engine within the nacelle.

Another object of the invention is to provide an airplane engine nacelle of the last mentioned character in which the means for controlling the flow of air through the annular air opening is in the form of an annular plug flap which is of airfoil cross section and is mounted concentrically within the nacelle so that it is shiftable axially to and from a closed position wherein it fills or closes the air opening between the propeller spinner and the adjacent end of the nacelle.

A further object of the invention is to provide in connection with a nacelle of the type and character under consideration simple and novel means for shifting the annular plug flap into and out of its closed position.

A still further object of the invention is to provide an airplane engine nacelle which is generally of new and improved construction and is characterized by extremely high efficiency so far as the control of air therethrough for engine cooling purposes is concerned.

Other objects of the invention and the various advantages and characteristics of the present airplane engine nacelle will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

2

Figure 1 is a perspective view of a pusher type airplane having applied thereto an engine nacelle embodying the invention;

Figure 2 is a vertical transverse section through the nacelle;

Figure 3 is a longitudinal section taken on the line 3—3 of Figure 2 and illustrating in detail the construction and design of the axially shiftable plug flap which serves to control the flow of air through the annular air opening between the propeller spinner and the adjacent end of the nacelle;

Figure 4 is a longitudinal section on the line 4—4 of Figure 3; and

Figures 4a and 4b are enlarged cross sections taken respectively on the lines 4a—4a and 4b—4b of Figure 3 and showing in detail one of the parts or units of the mechanism for shifting the plug flap to and from the annular air opening for air flow controlling purposes.

The nacelle which is shown in the drawings constitutes the preferred form or embodiment of the invention. It is designated by the reference numeral 5 and is illustrated in connection with, and as forming a part of, a pusher type airplane A. The latter embodies a fuselage $a$ having a wing structure $a^1$ at its sides for supporting purposes. The rear end of the fuselage $a$ is provided with an engine $a^2$ and this is connected to drive a propeller $a^3$. As shown in the drawings, the propeller is located directly behind the engine and has at its hub portion a rearwardly tapered conoidal spinner $a^4$. The nacelle 5 surrounds and serves as a housing medium for the propeller driving engine $a^2$ and is tubular in form. It is suitably connected to the rear end of the fuselage $a$ and has at its front end an air inlet (not shown). In general the nacelle is circular in cross section. The rear or trailing end of the nacelle is rearwardly tapered and has its end edge positioned adjacent and in spaced relation around the front end of the spinner $a^4$ in order to form between it and the spinner an annular air opening 6. When the airplane A is in operation air enters the nacelle 5 via the aforementioned inlet at the front end of the nacelle, then flows rearwards through the nacelle and finally is exhausted via the annular air opening 6. During travel of the air through the nacelle it flows around and past the engine $a^2$ and effects cooling of the latter by the absorption of heat therefrom. A ring shaped stiffener 7 is fixedly secured to the inner periphery of the rear or trailing end of the nacelle 5 as best shown in Figure 2. This stiffener assists in defining the annular air opening 6 and is streamline in contour for aerodynamic reasons.

Associated with the nacelle 5 is an annular plug flap 8 and this is disposed concentrically within the rear end of the nacelle and serves as a valve instrumentality or medium for controlling the flow of air through the annular air opening 6. As shown in the drawings the plug flap 8 is of airfoil cross section and has a transversely curved or rounded front end. The rear or trailing end of the plug flap is rearwardly tapered. The plug flap is mounted so that it is shiftable axially into and out of a closed position wherein the central or intermediate portion thereof substantially fills or closes the air opening 6. The mounting for the plug flap comprises a plurality of brackets 9 and a corresponding number of screw shafts 10. Preferably there are four brackets 9 and these are connected to, and project radially outwards from, the leading end of the plug flap 8. The brackets consist of narrow arm-like intermediate parts 9$^a$, attachment plates 9$^b$ at the inner ends of the parts 9$^a$, and outwardly extending bifurcated or fork-like members 9$^c$ at the outer ends of said parts 9$^a$. The attachment plates 9$^b$ are shaped conformably to the leading end of the plug flap 8 and are welded or otherwise fixedly secured thereto. The screw shafts 10 are located adjacent the outer ends of the brackets 9 and are disposed within, and extend longitudinally of, the nacelle 5. They are arranged in parallel relation and are operatively connected to the fork-like members 9$^c$ of the brackets by nuts 11. The latter fit within, and are suitably secured to, said fork-like members 9$^c$ and are mounted on the shafts 10 respectively. When the shafts are conjointly rotated in one direction they operate through the medium of the nuts to shift the plug flap 8 rearwards into its closed position wherein the central portion thereof is disposed within the annular air opening 6. Conjoint reverse rotation on the part of the screw shafts 10 results in the plug flap 8 being shifted forwards into its open position. By turning the screw shafts the plug flap may be shifted forwards or rearwards with respect to the air opening 6 into any desired position wherein it serves in the desired manner to control the volume of air passing rearwards through the opening and thus regulates the heat of the engine $a^2$. The screw shafts 10 are disposed within, and extend longitudinally of, horizontally elongated housings 12 within the rear or trailing end of the nacelle 5. Each of these housings consists of a pair of laterally spaced side walls 12$^a$, an outer wall 12$^b$ and an inner wall 12$^c$. The outer walls of the housings are connected to the outer margins of the side walls and have the rear ends thereof suitably secured to the nacelle 5 at points directly in front of the ring shaped stiffener 7. Preferably the side and outer walls of the housings are formed of sheet metal stampings of channel shaped cross section. The inner walls 12$^c$ of the housings are suitably connected to the inner margins of the housings side walls 12$^a$ and are formed of rubber or other resilient material. They serve as dust guards for the housings and have formed therein centrally disposed longitudinally extending slits 12$^d$ through which the narrow arm-like parts 9$^a$ of the brackets 9 extend slidably. The rear ends of the screw shafts 10 are journalled in bearings 13 which extend between, and are fixedly secured to, the rear ends of the side walls 12$^a$ of the housings 12. The front ends of the screw shafts are journalled in bearings 14 and these, as shown in the drawings, are disposed forwards of the housings sides 12$^a$. The housings 12 are supported with respect to the nacelle 5 by way of pairs of laterally spaced radially extending plates 15, the inner margins of which are connected to the side walls 12$^a$ of the housings and the outer margins of which are suitably connected to the inner periphery of the rear or trailing end of the nacelle 5.

The screw shafts 10 are conjointly turned to effect adjustment or shift of the plug flap 8 by way of means or mechanism comprising an electric motor 16, a speed reducing unit 17, a circular series of flexible shafts 18 and worm and worm gear driving connections 19. The electric motor 16 is preferably located in the bottom portion of the rear or tailing end of the nacelle 5 and is suitably supported by a bracket structure 20. It is of the reversible type and receives current from an electrical source (not shown) under control of switch mechanism (also not shown) in the pilot's compartment of the airplane A. The speed reducing unit 17 is associated with the reversible electric motor 16 and embodies certain gearing which is connected for drive by the armature shaft of the motor. The gearing includes a transversely extending driven shaft and is mounted in a casing 17$^a$ which is joined to the casing of the motor 16. The flexible shafts 18 are rotatably mounted in arcuate tubes 21 and serve operatively to connect the worm and worm gear connections 19 for drive by the driven shaft of the speed reducing unit 17. As shown in Figure 3, the tubes 21 are arranged in an annular or circular series within the nacelle 5 and are positioned adjacent the front ends of the housings 12. Inwardly extending brackets 22 on the inner periphery of the nacelle serve fixedly to support the tubes 21 in their operative position within the nacelle.

The worm and worm gear connections correspond in number to, and are associated respectively with, the screw shafts 10. They are housed within gear boxes 23 on the front end of the housings 12 and comprise worms 19$^a$ and worm gears 19$^b$. The worms extend at right angles to the screw shafts 10 and are fixedly connected to stub shafts 19$^c$ which are journalled in, and extend through, the gear boxes 23 and have the ends thereof drivably connected to the ends of the flexible shafts 18. The worm gears 19$^b$ are fixedly connected to the front ends of the screw shafts 10 and mesh with and are driven by the worms 19$^a$. As shown in Figure 3, the front ends of the screw shafts 10 project beyond the bearings 14 and into the gear boxes 23. The flexible shaft that extends between the two lowermost worm and worm gear driving connections 19 consists of two sections, the adjacent ends of which are drivably connected to the driven shaft of the speed reducing unit 17. When the electric motor 16 is driven in one direction the screw shafts 10 are conjointly driven in one direction through the medium of the flexible shafts 18 and the worm and worm gear driving connections 19 and operate axially to shift the plug flap 8 in one direction with respect to the annular air opening 6. When the electric motor is reversely driven the screw shafts are driven in the reverse direction and effect axial shift of the plug flap 8 in the opposite direction. Because the flexible shafts 18 are arranged in an annular or circular series and have the ends thereof connected to the shafts 19$^c$ on which the worms 19$^a$ are mounted the worm and worm gear driving connections 19 are always in operative connection with the driven shaft of the speed reducing unit 17 even though breakage of one of the flexible shafts occurs. The motor 16, the speed reducing unit 17, the flexible shafts 18 and the worm and worm gear driving connections 19 constitute simple means or mechanism for conjointly rotating the screw shafts to effect axial shift of the plug flap 8.

When the propeller driving engine $a^2$ of the airplane is started while in a cold condition the electric motor 16 is actuated so as to effect such drive of the screw shafts 10 as to cause the plug flap 8 to be shifted rearwards into its closed position wherein it substantially fills or closes the air opening 6 between the trailing end of the nacelle 5 and the front end of the spinner $a^4$. When the plug flap is in its closed position it so curtails the flow of air through the nacelle that the engine $a^2$ in connection with operation thereof quickly heats. As soon as the engine is heated to the desired temperature the plug flap 8 is shifted forwards into its fully open or a partially open position so as to permit air to circulate rearwards through the nacelle and thus maintain the engine $a^2$ at the desired temperature. By axially adjusting the plug flap 8 to and from the air opening 6 the flow of air through the nacelle may be so controlled as to maintain the engine $a^2$ at any desired temperature. The herein described engine nacelle, because it includes the axially shiftable valve type plug flap 8, is highly efficient and effectively and efficiently fulfills its intended purpose.

Whereas the nacelle and associated parts have been described in connection with a pusher type airplane it is to be understood that it may be used equally as well in connection with a tractor type airplane, it being clearly manifest that to adapt the nacelle and associated parts for use with a tractor type airplane it is only necessary to reverse the nacelle and plug flap and locate the screw shafts and brackets adjacent the trailing rearwardly tapered end of the plug flap. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. The combination with an airplane having a spinner equipped propeller and a propeller driving engine adjacent the propeller, of a tubular nacelle extending around and longitudinally of the engine, adapted to have air flow longitudinally therethrough for engine cooling purposes and having the end thereof that is adjacent the propeller of substantially circular contour, fixed, and spaced from the spinner so as to form an annular opening therebetween, and a single annular plug flap of airfoil cross section positioned concentrically with respect to, and adapted to control the flow of air through, the nacelle, having substantially the same external and internal diameters as, and disposed in alignment with, said opening, and mounted so that it is shiftable axially back and forth between an open position wherein it is disposed wholly within the nacelle and a closed position wherein it fits within, and serves by a wedging action substantially fully to close, said opening.

2. The combination with a pusher type airplane having a spinner equipped propeller and a propeller driving engine directly in front of the propeller, of a tubular nacelle extending around and longitudinally of the engine, adapted to have air flow rearwards therethrough for engine cooling purposes and having the trailing end thereof of substantially circular contour, fixed, and spaced from the front end of the spinner so as to form an annular air opening therebetween, and a single annular plug flap of airfoil cross section positioned concentrically with respect to, and adapted to control the flow of air through, the nacelle, having substantially the same external and internal diameters as, and disposed in alignment with, the opening, and mounted so that it is shiftable axially back and forth between an open position wherein it is disposed wholly within the nacelle and a closed position wherein its fits within, and serves by a wedging action substantially fully to close, said opening.

3. The combination with an airplane having a spinner equipped propeller and a propeller driving engine adjacent the propeller, of a tubular nacelle extending around and longitudinally of the engine, adapted to have air flow longitudinally therethrough for engine cooling purposes, and having the end thereof that is adjacent the propeller of substantially circular contour, fixed. and spaced from the spinner so as to form an annular air space therebetween, an annular plug flap of airfoil cross section positioned concentrically with respect to, and adapted to control the flow of air through, the nacelle, having substantially the same external and internal diameters as, and positioned in alignment with, the opening and mounted so that it is shiftable axially back and forth between an open position wherein it is disposed wholly within the nacelle and a closed position wherein it fits within, and serves by a wedging action substantially fully to close, said opening. and mechanism for shifting the plug flap back and forth between said positions disposed in the nacelle and comprising a plurality of rotatably mounted screw shafts arranged adjacent and in a circular series around the plug flap and positioned in parallel relation with the axis of the flap, nuts mounted on the screw shafts and connected to said plug flap, a reversible electric motor, and means for connecting the screw shafts for conjoint drive by the motor, including an annular series of flexible shafts extending between the motor and said screw shafts and around the engine.

DALTON B. SUGGS.

REFERENCES CITED

The following references are of record in the file of this patent:

UNITED STATES PATENTS

| Number | Name | Date |
|---|---|---|
| 2,150,143 | Adams | Mar. 14, 1939 |
| 2,175,535 | Mercier | Oct. 10, 1939 |
| 2,246,498 | Blanding | June 24, 1941 |
| 2,270,912 | Theodorsen | Jan. 27, 1942 |
| 2,396,598 | Neumann et al. | Mar. 12, 1946 |

FOREIGN PATENTS

| Number | Country | Date |
|---|---|---|
| 416,065 | Great Britain | Sept. 10, 1934 |